United States Patent [19]
Bush et al.

[11] Patent Number: 5,802,491
[45] Date of Patent: Sep. 1, 1998

[54] MOTOR VEHICLE CONTROL SYSTEM AND METHOD

[75] Inventors: Gerd Bush, Gerlingen; Thomas Ehret, Seelbach; Fredrich Kost, Kornwestheim; Karl-Josef Weiss, Stuttgart, all of Germany

[73] Assignee: Robert Bosch GmbH, Stuttgart, Germany

[21] Appl. No.: 526,249

[22] Filed: Sep. 11, 1995

Related U.S. Application Data

[63] Continuation-in-part of Ser. No. 118,825, Sep. 10, 1993, abandoned.

[30] Foreign Application Priority Data

Sep. 10, 1992 [DE] Germany ............... 42 30 295.1

[51] Int. Cl.$^6$ ............... B60T 8/32
[52] U.S. Cl. ............... 701/76; 701/92; 303/122; 303/DIG. 7
[58] Field of Search ............... 364/424.098, 424.034, 364/426.016, 426.021, 426.038, 565; 180/197; 303/122, 122.01, 122.02, 122.06, DIG. 7; 701/69, 29, 72, 76, 92

[56] References Cited

U.S. PATENT DOCUMENTS

| 4,545,623 | 10/1985 | Sato et al. | 303/122.02 |
|---|---|---|---|
| 5,060,747 | 10/1991 | Eto | 364/424.098 |
| 5,200,897 | 4/1993 | Makino et al. | 364/424.021 |
| 5,292,184 | 3/1994 | Takata | 364/426.016 |
| 5,299,131 | 3/1994 | Haas et al. | 364/426.038 |
| 5,490,070 | 2/1996 | Kiryu et al. | 180/197 |

*Primary Examiner*—Gary Chin
*Attorney, Agent, or Firm*—Spencer & Frank

[57] ABSTRACT

A control system for motor vehicles in which the errors in wheel velocities created by tolerances between the tires are compensated.

20 Claims, 2 Drawing Sheets

5,802,491

MOTOR VEHICLE CONTROL SYSTEM AND METHOD

CROSS REFERENCE TO RELATED APPLICATION

This application is a Continuation-in-Part of U.S. patent application Ser. No. 08/118,825, filed Sep. 10, 1993, the subject matter of which is incorporated herein by reference.

This application claims the priority of Application Ser. No. P 42 30 295.1, filed Sep. 10, 1992, in the Federal Republic of Germany, the subject matter of which is incorporated herein by reference.

BACKGROUND OF THE INVENTION

The present invention relates to a method and apparatus for controlling the brake pressure of the wheel brakes of a vehicle including influencing the wheel velocities to provide compensation for different wheel radii.

Published German Patent Application DE-A1-4,019,886, which corresponds to U.S. Pat. No. 5,179,526, discloses a slip control system for a motor vehicle, the system including sensors for determining the velocity of the wheels, a control device to which these signals are fed and which generates control signals, regulating devices that are charged with these control signals and comprise wheel velocity signal influencing means for compensating for differences in wheel radii, with one wheel being selected as the reference wheel whose velocity signal remains uninfluenced, by determining correction factors for the wheel velocity signals of the other wheels.

SUMMARY OF THE INVENTION

According to a first aspect of the invention, there is provided a control system for the wheel brakes of a motor vehicle of the type including sensors for determining the velocity of the wheels Vr0i (i=1, ..., 4), a control device to which these wheel velocity signals are fed and which generates control signals, regulating means that are charged with these control signals to control the wheel brake pressure, and wheel velocity signal influencing means for compensating for differences in wheel radii, with one of the wheels being selected as the reference wheel whose velocity signal remains uninfluenced, by determining correction factors or values ri for the wheel velocity signals of the other wheels; and wherein the wheel velocity signal influencing means includes:

means for determining relative tolerance values ρi according to the following equations $$\rho_1 = 0$$

$$\rho_2 = \frac{v - B\dot{\psi}}{Vfr2} - 1$$

$$\rho_3 = \frac{(v - B\dot{\psi})\cos\delta + (Vy + Rv\dot{\psi})\sin\delta}{Vfr3} - 1$$

$$\rho_4 = \frac{v + B\dot{\psi}}{Vfr4} - 1$$

where i=2 and i=4 identify the rear wheels, i=1 identifies the reference wheel, B and Rv are vehicle constants, Vy is the determined transverse velocity, $\dot{\psi}$ is the determined yaw velocity and δ is the steering angle, v is given by the equation $$v = \frac{Vfr1 - (Vy + Rv\dot{\psi})\sin\delta}{\cos\delta} - B\dot{\psi}$$

and the free-rolling (slip-corrected) wheel velocities Vfri (i=1–4) of the wheels are determined according to the relationship $$Vfri = \frac{Vr0i\,(1 + ri)}{1 - Fbi/ci}$$

where Fbi represents the tire forces in the longitudinal direction and ci represents the longitudinal rigidity of the tires, while for the reference wheel (i=1) r1=0;

a first lowpass filter of the first order for filtering the relative tolerance values ρi to yield filtered tolerence values $\rho_{Fi}$ according to the relationship $$\rho_{Fi,t+1} = \rho_{Fi,t} + k1(\rho_{i,t} - \rho_{Fi,t})$$

where i=1, ..., 4, t is the time, and k1 is a filter coefficient;

a second first order lowpass filter, having a higher time constant than said first lowpass filter, for filtering the filtered tolerence values to provide the absolute tolerence correction values ri and in which the absolute tolerance correction values ri are brought up to date correction according to the relationship $$ri,t+1 = ri,t + k2\rho_{Fi,t+1}(1 + ri,t)$$

where i=1, ..., 4 and k2 is a second filter coefficient; and, means for using the up-to-date correction values ri,t+1 to correct the wheel velocity signals and, in the next following computing cycle, to determine the free-rolling wheel velocities.

According to the preferred embodiment, further means are provided to permit the tire tolerance correction values ri to be determined only if various conditions, e.g., if no braking occurs and neither the brake nor the driven wheels are controlled, are present.

According to the second aspect of the invention, a method of controlling the brakes for a motor vehicle is provided and is of the type including the steps of determining the velocity of the wheels Vr0i (i=1, ..., 4) to provide wheel velocity signals, evaluating these signals to generate control signals, regulating the brake pressure based on these control signals, and influencing the wheel velocity signals to compensate for differences in wheel radii, with one wheel being selected as the reference wheel whose velocity signal remains uninfluenced, by determining and applying correction factors or values ri for the wheel velocity signals of the other wheels; and wherein the step of influencing includes:

determining relative tire tolerances ρi according to the following equations $$\rho_1 = 0$$

$$\rho_2 = \frac{v - B\dot{\psi}}{Vfr2} - 1$$

$$\rho_3 = \frac{(v - B\dot{\psi})\cos\delta + (Vy + Rv\dot{\psi})\sin\delta}{Vfr3} - 1$$

$$\rho_4 = \frac{v + B\dot{\psi}}{Vfr4} - 1$$

where i=1 identifies the reference wheel, i=2 and i=4 identify the rear wheels, B and Rv are vehicle constants, Vy is the determined transverse velocity, $\dot{\psi}$ is the determined yaw velocity, δ is the steering angle, v is given by the equation $$v = \frac{Vfr1 - (Vy + Rv \, \dot\psi)\sin\delta}{\cos\delta} - B \, \dot\psi$$

and the free-rolling (slip-corrected) wheel velocities Vfri (i=1–4) of the wheels are determined according to the following relationship $$Vfri = \frac{VrOi\,(1+ri)}{1 - Fbi/ci}$$

where Fbi represents the tire forces in the longitudinal direction and ci the longitudinal rigidity of the tires, while for the reference wheel (i=1) r1=0;

filtering the relative tolerance values $\rho i$ with a lowpass filter of the first order to yield filtered tolerence values $\rho_{Fi}$ according to the relationship $$\rho_{Fi,t+1} = \rho_{Fi,t} + k1(\rho_{i,t} - \rho_{Fi,t})$$

where i=1, . . . , 4 and k1 is a filter coefficient;

filtering the filtered tolerance values $\rho_{Fi}$ with a second first order lowpass filter having a higher time constant than the first filter to provide the absolute tolerence correction values ri and in which the absolute tolerance correction values ri are brought up to date according to the relationship $$ri, t+1 = ri, t + k2\rho_{Fi,t+1}(1+ri,t)$$

where i=1, . . . , 4 and k2 is a second filter coefficient; and, using the up-to-date correction values ri,t+1 to correct the wheel velocity signals and, in the next following computing cycle, to determine the free-rolling wheel velocities.

BRIEF DESCRIPTION OF THE DRAWINGS

One embodiment of the invention will now be described in greater detail with reference to the drawing figures, in which.

DETAILED DESCRIPTION OF THE PREFERRED EMBODIMENT

Figure 1:
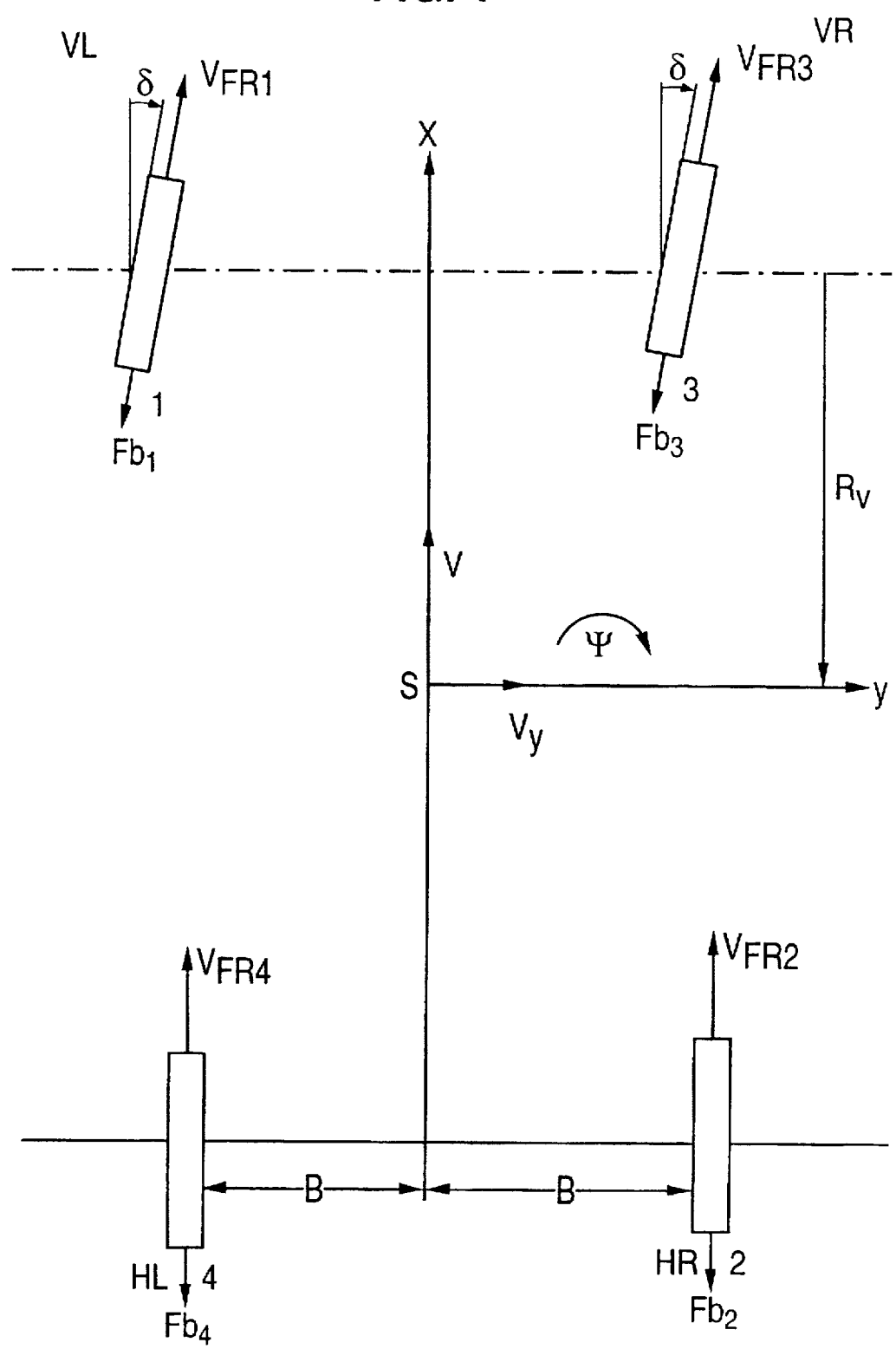
FIG. 1 depicts a model of a motor vehicle with the occurring values being indicated.

In the present invention, the term control system is understood to mean a control system in which the precise rate of rotation of the wheel is required for the control. These systems may be, for example, ABS, ASC or drag control systems. Because of the determination (measurement or estimation) of additional influential parameters, such as yaw velocity and transverse velocity, the determination of the tire tolerance according to the present invention is preferably employed wherever these values are determined for control reasons. This is the case, for example, in the control of driving dynamics in which a counter-yaw moment is generated by producing intentional brake slip, for example, in order to compensate for a yaw moment. Moreover, the following discussion of the invention is initially undertaken with reference to FIG. 1 which schematically shows a motor vehicle with driving occurring values of interest being indicated.

Compared to the prior art, the method according to the present invention permits a much more accurate correction of the wheel velocity signal. With this method it is possible to obtain an error-free correction even if the steering wheel is turned slightly and if the driving and dragging torque are very low.

It should be pointed out that the invention relates to a tolerance alignment of the vehicle tires in a system which is known per se, wherein the brake devices and/or the propulsion devices of the vehicle, generally the vehicle engine, are actuated for the regulation or control of the driving stability. Influencing the propulsion of the vehicle contemplates, in particular, changing, for example, the ignition, the fuel supply and/or the air supply (load) of the engine in a manner that is known per se for the regulation or control of the driving stability.

Prerequisites for the proper determination of tire tolerances are the following conditions:

(1) no active engine drag moment control;
(2) no active wheel slip control at the driven wheels;
(3) no brake actuation by the driver;
(4) no brake actuation due to driving dynamics control;
(5) sufficiently high longitudinal velocity Vf of the vehicle (e.g. Vf>5 m/s);
(6) driving torque and drag are sufficiently low (e.g., |wheel moment|<400 Nm);
(7) $|\dot\psi| < g^* \mu_m/Vf$, $g=9.81$ m/s$^2$, e.g., $\mu_m=0.1$, Y is the yaw velocity.

Explanations:

conditions (1) to (4) are indices of the stable running of the wheels;

condition (5) ensures that errors due to an offset in the yaw angle velocity remain low;

condition (6) ensures that errors due to imprecisely known longitudinal tire rigidities remain small;

condition (7) together with condition (5) ensure that the vehicle is in a stable driving state.

For reasons of interference suppression, the desired absolute tolerances or correction values (factors) ri are determined by way of relative tolerances $\rho_j$. This is done on the basis of the following equations:

$$\left. \begin{array}{ll} v = \dfrac{Vfr1 * (1+\rho_1) - (Vy + Rv * \dot\psi) * \sin\delta}{\cos\delta} - B * \dot\psi & (a) \\[2mm] v = Vfr2 * (1+\rho_2) + B * \dot\psi & (b) \\[2mm] v = \dfrac{Vfr3 * (1+\rho_3) - (Vy + Rv * \dot\psi) * \sin\delta}{\cos\delta} + B * \dot\psi & (c) \\[2mm] v = Vfr4 * (1+\rho_4) - B * \dot\psi & (d) \end{array} \right\} \quad (1)$$

where, because wheel 1 is the reference wheel, $\rho_1 = 0$.

It should be pointed out that any wheel of the vehicle may be selected as reference wheel. In the following embodiment, the left front wheel is selected as reference wheel by way of example.

The equations (1a–d) represent transformation equations with which the velocities vrfi of the wheels, which were slip-corrected according to equation (6), are transformed into a reference point of the vehicle. The center of gravity of the vehicle or the axle mid-point of the rear vehicle axle, for example, may be defined as vehicle reference point. In the case of a transformation, the quantity Rv cited below represents the distance between the front axle and the axle mid-point of the rear axle selected as reference point.

Under the assumption that the transverse vehicle velocity vy assumes small values, it can be neglected in the equations (1a–d) as well as in the equations that follow and it can thus be set to zero in these equations. In this simplified embodiment variant, the determination of the transverse vehicle velocity vy is dropped. Neglecting the transverse vehicle velocity can be seen as dealing with a stationary cornering of the vehicle.

In the event that the transverse vehicle velocity vy is considered, it can be determined with the aid of a vehicle model while taking into account the measured or determined transverse vehicle acceleration, the measured steering angle, the measured or determined yaw velocity as well as the measured or determined longitudinal vehicle velocity. Here, it should be mentioned that, in general, a sensory detection of the steering angle, the yaw velocity and the transverse vehicle acceleration is contemplated. But the yaw velocity can also be determined, for example, from the measured transverse accelerations of the front section of the vehicle and of the rear section of the vehicle.

These above-mentioned relative tolerances can be determined as follows:

First, the longitudinal vehicle velocity v available in the reference point Rv is transformed into the wheel suspension points with the aid of transformation equations (1a–d). The selection of equation (1a) follows based on the selection of wheel 1 as reference wheel. Thus, one obtains the wheel reference velocities vrefi:

$$vref2 = v - B \cdot \dot\psi$$

$$vref3 = (v - B \cdot \dot\psi) \cos \delta + (vy + Rv \cdot \dot\psi) \sin \alpha\delta$$

$$vref4 = (v + B \cdot \dot\psi)$$

These wheel reference velocities represent the velocities in the wheel suspension points above ground, which can be considered the wheel velocities to be expected based on the vehicle movement and under the assumption that the wheels are rolling essentially slip-free. The relative tolerances represent the ratio of the wheel reference velocities to the slip-corrected wheel velocities.

At the same time, the equations (1a–d) can also be represented as transformation equations with which the slip-corrected wheel velocities vfri are transformed into the reference point S of the vehicle (if the center of gravity is selected as reference point, it has the above-mentioned distance Rv from the front axle of the vehicle). This means that, because of the equations (1a–d), there is a causal relationship between the slip-corrected velocities vfri and the longitudinal vehicle velocity v in the reference point with reference to the vehicle geometry and the vehicle movement described by the quantities steering angle $\delta$, yaw velocity $\dot\psi$ and transverse vehicle velocity vy.

Since wheel 1 is selected as reference wheel, wherefore the relative tolerance p1 of wheel 1 can be assigned the value zero, for example, the longitudinal vehicle velocity v above ground in the reference point can be calculated with the assistance of equation (1a). The relative tolerances pi can be calculated by transforming the equations (1b–d) so that the equations (2) are generated in this manner. In this process, the expressions appearing in the numerators of the fractions represent the wheel reference velocities vrefi. These are listed again in the following:

$$vref2 = vfr2(1+\rho2) - v - B \cdot \dot\psi$$

$$vref3 = (vfr3(1+\rho3) = (v - B \cdot \dot\psi) \cos \delta + (vy + Rv \cdot \dot\psi) \sin \delta$$

$$vref4 = vfr4(1+\rho4) = v + B \cdot \dot\psi$$

The wheel reference velocities vrefi represent the velocities in the wheel suspension points above ground, which can be considered the wheel velocities to be expected based on the vehicle movement and under the assumption that the wheels are rolling essentially slip-free. The relative tolerances pi represent the deviation of the slip-corrected wheel velocities vfri of from the expected wheel reference velocities vrefi.

Since the determination of the relative tolerances pi takes place in a cyclical process, starting values for the relative tolerances must be preset. This may be realized, on the one hand, by setting the relative tolerances to zero in the first cycle. The relative tolerances converge within a few subsequent cycles towards the relative tolerances which are actually present in reality. On the other hand, the relative tolerances last determined during a driving event can be stored in a storage medium before the vehicle is turned off. Thus, these relative tolerances of the last driving event are available at the beginning of a new driving event and can thus be used as starting values.

From Equations (1) the relative tolerances are calculated as follows:

$$\left. \begin{array}{l} \rho_2 = \dfrac{v - B * \dot\psi}{Vfr2} - 1 \\[4pt] \rho_3 = \dfrac{(v - B * \dot\psi) * \cos\delta + (Vy + Rv * \dot\psi) * \sin\delta}{Vfr3} - 1 \\[4pt] \rho_4 = \dfrac{v + B * \dot\psi}{Vfr4} - 1 \end{array} \right\} \quad (2)$$

where (as indicated in FIG. 1)

Vfri is the velocity of the freely rolling wheels i;

$\dot\psi$ is the yaw velocity about the elevation axis;

Vy is the transverse velocity;

$R_v$ is a vehicle constant for the distance between the front axle and the center of gravity, e.g. 1.5 m;

B is a vehicle constant for half the track width, e.g. 0.7 m;

$\delta$ is the steering angle; and v is defined according to Equation (1) (a).

If the absolute tolerance values ri employed for the calculation of Vfri deviate from the true tolerance values, values result for $\rho_2, \rho_3, \rho_4$ which are unequal to zero. The true tolerances ri' can be calculated as follows:

$$ri' = (1+ri)*(1+\rho_i) - 1 \qquad (3)$$

These values for ri' can be employed to obtain the following matching condition which must be met to obtain ri.

(8) max (r1', r2', r3', r4') – min (r1', r2', r3', r4') < K, where K is a constant low percentage, e.g. K=0.06

If all of the above conditions (1) to (8) are met, the values for $\rho_i$ calculated from Equation (2) are filtered in a lowpass filter of the first order (time constant, for example, about 2 s):

$$\rho_{Fi,t+1} = \rho_{Fi,t} + k1*(\rho_{i,t} - \rho_{Fi,t}) \qquad (4)$$

where i=1, . . . , 4; and k1 . . . is a filter coefficient, for example, k1=0.01.

These values for $\rho_{Fi}$ are fed to a second lowpass filter of the first order (time constant about 10 s) which brings the absolute tolerances up to date as follows:

$$ri, t+1 = ri, t + k2*\rho_{Fi,t+1}*(1+ri,t) \qquad (5)$$

where i=1, . . . , 4, and k2 . . . is a filter coefficient, e.g., k2=0.002.

The values for ri,t converge toward the true values, while the values for $\rho_{Fi,t}$ converge toward zero.

If one of conditions (1) to (8) is not met, the following is set:

$$\rho_{Fi,t+1} = 0$$

and ri,t+1, i.e., i=1, retains the value of the preceding computing cycle ri,t. This procedure ensures that a distinct correction of ri,t takes place only if conditions (1) to (8) are met without interruption for a long enough period of time.

The above mentioned free-rolling wheel velocities Vfri are determined as follows:

$$Vfri = \frac{Vr0i * (1 + ri)}{1 - Fbi/ci} \quad (6)$$

where i=1, . . . , 4

Vr0i . . . are the raw values of the measured wheel velocities;

Fbi . . . are the tire forces in the longitudinal direction;

ci . . . is the longitudinal rigidity of the tires; and, ri . . . are the tolerances of the rolling radii of the tires.

By considering the spin theorem, with which the following equation can be stated, the longitudinal tire force can be derived:

$$\frac{\theta_{wheeli}}{r_{wheeli}} \cdot vroi = cpi \cdot P_{wheel\ break\ cyl.\ i} + Fbi \cdot r_{wheeli} + M_{awheeli}$$

The variables comprised in this equation have the following meaning:

$\theta_{wheeli}$: mass moment of inertia of wheel i $r_{wheeli}$: wheel diameter of wheel i, (generally preset)

vr0i: raw value of the measured wheel velocity of wheel i cpi: reinforcement factor of the brake of wheel i $P_{wheel\ brake\ cyl.i}$: wheel brake cylinder pressure of wheel i Fbi: longitudinal tire force of wheel i $M_{aradi}$: driving torque of wheel i The wheel with index 1, i.e., i=1 is considered to be the reference wheel so that the following applies for it:

$r1=0$

The slip created by the transmitted longitudinal force of the tire is considered in Equation (6) by the term Fbi/ci.

The absolute tolerances obtained from Equation (5) are further processed according to Equation (6) to yield the desired velocities Vfri.

Figure 2:
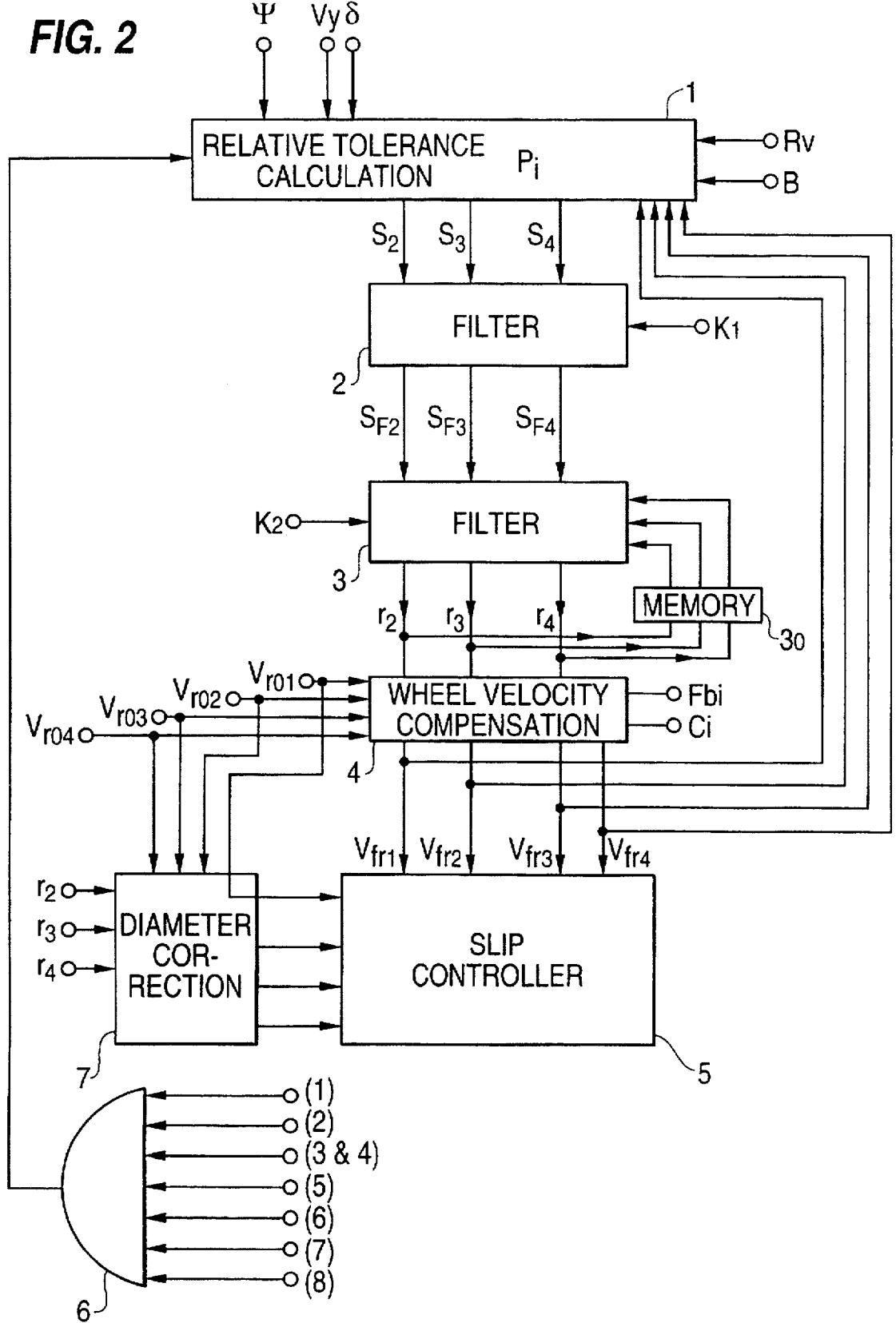
FIG. 2 is a block circuit diagram for an embodiment of the present invention.

Turning now to FIG. 2, the measured (or estimated) values for yaw velocity $\psi$, transverse velocity Vy and the steering angle $\delta$ are furnished to a block 1 for forming relative tolerance values. In addition, the vehicle specific values of $R_v$ and B and the free-rolling wheel velocities Vfr2 to Vfr4 are furnished to block 1. In this block 1, the relative tolerances $\rho_2$ to $\rho_4$ are calculated according to the above Equation (2). In a first filter 2 of the first order, filtered values $\rho_{Fi}$ are obtained (according to Equation (4) above) from the relative tolerence values furnished by block 1. These filtered values are fed to a second first order filter 3 which calculates the absolute tolerances r2 to r4 according to Equation (5). This calculation requires values r2 to r4 that were calculated in the preceding computer cycle and stored intermediately in a memory 3a.

With the aid of the measured raw velocities of the wheels Vr02 to Vr04 and constants as well as the absolute tolerances r2 to r4, the free-rolling velocities Vfri for the wheels are determined in block 4 and fed, together with the velocity Vr01=Vfr1 of the reference wheel, to a controller 5 which needs these velocities as input values.

An AND-gate 6 activates the determination of these velocities only if the above-mentioned conditions (1) to (8) are met.

The slip-corrected wheel velocities vfri are fed to the slip controller 5. The slip controller 5 controls or regulates the braking slip and/or drive/propulsion slip, which is present at the individual vehicle wheels, in a manner which is known per se.

By means of block 7 in FIG. 2, the wheel velocities vr0i which were wheel-diameter-corrected according to the invention are fed to the slip controller 5. For the above-mentioned slip regulation or slip control, the slip that is present at each wheel can thus be calculated in block 5 from the wheel velocities vr0i which were wheel-diameter-corrected according to the invention and the slip-corrected wheel velocities vfri.

It will be understood that the above description of the present invention is susceptible to various modifications, changes and adaptations, and the same are intended to be comprehended within the meaning and range of equivalents of the appended claims.

What is claimed is:

1. In a method for actuating at least one of the vehicle units brake device and propulsion device, with said actuation being a function of at least the respective wheel velocities, which are represented by detected wheel velocity signals, and in which one of the vehicle wheels is selected as a reference wheel and, starting from the wheel velocity of the reference wheel and for the consideration of the different wheel diameters of the other vehicle wheels, the respective detected wheel velocity signals of the other wheels are corrected by respective correction values, and the corrected wheel velocity signals are utilized for said actuation; and further comprising:

determining the yaw velocity, the steering angle and the longitudinal tire forces of the respective wheels, determining respective slip-corrected wheel velocities as a function of the respective detected wheel velocities and the respective determined longitudinal tire forces, determining a quantity describing the longitudinal vehicle velocity as a function of the determined slip-corrected wheel velocity of the reference wheel, the determined steering angle and the determined yaw velocity, determining respective wheel reference velocities starting from the determined quantity describing the longitudinal vehicle velocity and in further dependence on the determined yaw velocity and steering angle, and determining said correction values as a function of the slip-corrected wheel velocities and the determined wheel reference velocities.

2. A method according to claim 1, wherein the correction of the detected wheel velocities is carried out cyclically and, in addition, the determination of the slip-corrected wheel velocities continues to occur at least as a function of the respective said correction values, which were determined in a previous cycle.

3. A method according to claim 1, wherein the determined correction values are filtered by at least one low-pass filter before the correction of the detected wheel velocity signals and the correction of the detected wheel velocity signals is carried out using the filtered correction values.

4. A method according to claim 1, wherein the step of determining the yaw velocity and the steering angle, comprises measuring the yaw velocity and the steering angle.

5. A method according to claim 1, further comprising determining braking moments and propulsion moments acting at the respective wheels; and wherein the step of determining the longitudinal tire forces is carried out as a function of the respective wheel velocities, the determined braking moments and the determined propulsion moments.

6. A method according to claim 1 further comprising determining the transverse vehicle velocity; and wherein the step of determining a quantity describing the longitudinal vehicle velocity includes additionally forming the longitudinal vehicle velocity as a function of the determined transverse vehicle velocity.

7. A method according to claim 6, wherein the determination of the transverse vehicle velocity occurs as a function of at least one of the quantities comprising the transverse vehicle acceleration, the steering angle, the yaw velocity and the longitudinal vehicle velocity.

8. A method according to claim 1, wherein the actuation of at least the braking device or of the propulsion device is carried out such that the slip at the wheels is regulated, with the respective determined slip-corrected respective wheel velocities being used.

9. A method according to claim 2, wherein the actuation of at least the breaking device or of the propulsion device is carried out such that the slip at the respective wheels is regulated, with the respective determined slip-corrected wheel velocities being used.

10. A method according to claim 1, wherein the correction of the wheel velocity signals is carried out when at least one of the following prerequisites is determined:

the braking device is not operated;

the propulsion slip is below a preset threshold;

the moments acting upon the wheels are below a preset threshold;

the amount of the determined yaw velocity is below a preset threshold;

the determined vehicle velocity is above a preset threshold;

the difference between the maximum determined correction value and the minimum determined correction value is below a preset threshold.

11. A method according to claim 1, wherein, in addition, the determination of the slip-corrected wheel velocities vfri is carried out as a function of the tire rigidities ci $$vfri = \frac{vroi}{1 - Fbi/ci}$$

wherein vroi is the raw value of the measured wheel velocity i, and Fbi is the longitudinal tire force on wheel i.

12. A method according to claim 3, wherein, in addition, the determination of the slip-corrected wheel velocities vfri is carried out as a function of the tire rigidities ci and the filtered correction values ri of one of the previous computing cycles according to the relationship $$vfri = \frac{vroi(1 + ri)}{1 - Fbi/ci}$$

wherein vroi is the raw value of the measured wheel velocity i, and Fbi is the longitudinal tire force on wheel i.

13. A method according to claim 1, wherein the quantity v describing the longitudinal vehicle velocity is determined, in addition to the determined steering angle $\delta$, the determined yaw velocity $\dot\psi$ and the determined slip-corrected wheel velocity vfr1 of the reference wheel, by quantities Rv and B, which describe the vehicle geometry, according to the relationship $$v = \frac{vfr1 - Rv \cdot \dot\psi \cdot \sin\delta}{\cos\delta} - B \cdot \dot\psi$$

where Rv is the distance between the vehicle front axle and the vehicle center of gravity, and B is one half of the vehicle track width.

14. A method according to claim 7, wherein the determination of the quantity v describing the longitudinal vehicle velocity is determined, in addition to the determined steering angle $\delta$, the determined yaw velocity $\dot\psi$, the determined transverse vehicle velocity vy and the determined slip-corrected wheel velocity vfr1 of the reference wheel, by quantities Rv and B, according to the relationship $$v = \frac{|vfr1 - (vy + Rv \cdot \dot\psi) \cdot \sin\delta|}{\cos\delta} - B \cdot \dot\psi$$

where Rv is the distance between the vehicle front axle and the vehicle center of gravity, and B is one half of the vehicle track width.

15. A method according to claim 1, wherein wherein the respective wheel reference velocities vref2, vref3 and vref 4 are determined, starting from the determined quantity v describing the longitudinal vehicle velocity and in consideration of the determined yaw velocity $\dot\psi$ and the steering angle $\delta$, according to the relationships $$vref2 = v - B \cdot \dot\psi$$

$$vref3 = (v - B \cdot \dot\psi) \cos\delta + (vy + Rv \cdot \dot\psi) \sin\delta$$

$$vref4 = v + B \cdot \dot\psi$$

where B is one half of the track width.

16. A method according to claim 7, wherein the respective wheel reference velocities vref2, vref3 and vref 4 are determined, starting from the determined quantity v describing the longitudinal vehicle velocity and in consideration of the determined yaw velocity $\dot\psi$, the steering angle $\delta$ and the transverse vehicle velocity vy, according to the relationships $$vref2 = v - B \cdot \dot\psi$$

$$vref3 = (v - B \cdot \dot\psi) \cos\delta + (vy + Rv \cdot \dot\psi) \sin\delta$$

$$vref4 = v + B \cdot \dot\psi$$

where B is one half of the vehicle track width.

17. A method according to claim 1, characterized in that the correction values p2, p3 and p4 are determined from the determined respective slip-corrected wheel velocities vfr1, vfr3 and vrfr and the vfr2, vfr3, and vfr4 determined respective wheel reference velocities according to the relationships $$\rho 2 = \frac{vref2}{vfr2} - 1$$

$$\rho 3 = \frac{vref3}{vfr3} - 1$$

$$\rho 4 = \frac{vref4}{vfr4} - 1.$$

18. In a control system wherein at least one of the vehicle units brake device and propulsion device is actuated, as a function of at least the respective wheel velocities, which are represented by detected wheel velocity signals, and including means for selecting one of the vehicle wheels as a reference wheel, for starting from the wheel velocity of the reference wheel and for the consideration of the different wheel diameters of the other vehicle wheels, correcting the respective detected wheel velocity signals of the other wheels by correction values, and for utilizing the correct wheel velocity signals to produce the actuation, said system further comprising:

means for determining the vehicle yaw velocity, the vehicle steering angle and the longitudinal tire forces of the respective wheels;

means for determining slip-corrected wheel velocities as a function of the respective wheel velocities and the respective determined longitudinal tire forces;

means for determining a quantity describing the longitudinal vehicle velocity as a function of the respective determined slip-corrected wheel velocity of the reference wheel, the determined steering angle and the determined yaw velocity;

means for determining respective wheel reference velocities starting from the determined quantity describing the longitudinal vehicle velocity and in further dependence on the determined yaw velocity and steering angle; and means for determining respective said correction values as a function of the respective slip-corrected wheel velocities and the respective determined wheel reference velocities.

19. A control system according to claim 18, wherein the system carries out the correction of the detected wheel velocities cyclically; and, in addition, the means for determining the slip-corrected wheel velocities in a cycle continues at least as a function of a respective said correction value which was determined in a previous cycle.

20. A control system according to claim 18, wherein the determined correction values are filtered by at least one low-pass filter before the correction of the detected wheel velocity signals and the correction of the detected wheel velocity signals is carried out by the filtered correction values.

* * * * *